United States Patent [19]
Saito

[11] 4,456,795
[45] Jun. 26, 1984

[54] BEHIND-THE-EAR TYPE HEARING AID

[75] Inventor: Osamu Saito, Akishima, Japan

[73] Assignee: Rion Kabushiki Kaisha, Tokyo, Japan

[21] Appl. No.: 343,334

[22] Filed: Jan. 27, 1982

[30] Foreign Application Priority Data

Feb. 13, 1981 [JP] Japan .............................. 56-19016

[51] Int. Cl.³ .......................................... H04R 25/02
[52] U.S. Cl. ........................ 179/107 H; 179/107 FD; 381/68; 381/69
[58] Field of Search ........... 179/107 H, 107 S, 107 R, 179/107 FD; 381/68, 69

[56] References Cited

U.S. PATENT DOCUMENTS

| 3,458,668 | 7/1969 | Hassler | 179/107 H |
| 3,491,214 | 1/1970 | Rosemond | 179/107 FD |
| 3,748,390 | 3/1974 | Gage | 179/107 H |
| 3,749,853 | 8/1974 | Ely | 179/107 H |
| 3,875,349 | 4/1975 | Ruegg | 179/107 FD |
| 3,946,168 | 3/1976 | Preves | 179/107 H |
| 4,142,072 | 2/1979 | Berland | 179/107 FD |

OTHER PUBLICATIONS

Wayne J. Staab, "Hearing Aid Handbook", p. 55, published as Tab Books No. 987, in 1978.
"Amplification for the Hearing-Impaired", 2nd ed., pp. 32 and 34, edited by Michael C. Pollack and published in 1980 by Grune & Stratton, Inc., New York, N.Y.
Hallowell Davis and S. Richard Silverman, "Hearing and Deafness", 4th ed., p. 314, published in 1978 by Holt, Rinehart and Winston.

Primary Examiner—Harold I. Pitts
Assistant Examiner—L. C. Schroeder
Attorney, Agent, or Firm—Wenderoth, Lind & Ponack

[57] ABSTRACT

A behind-the-ear type hearing aid which includes a main body adapted to hang on the user's earlobe on the rear side, an opening disposed at the front end of the main body to communicate with a microphone used for normal conversation, and a pair openings disposed on its rear end portion to communicate with a closed talking microphone for use with telephone conversations disposed in the main body. The close talking microphone may be connected to a low-pass filter with a cutoff frequency of about 1,000 hertz. The close talking microphone may also include two pressure type microphones which are substantially identical in sensitivity and are disposed adjacent to each other. One of those microphones has an output connected to that of the other microphone through a phase inverter with or without a gain control connected across the phase inverter.

11 Claims, 6 Drawing Figures

BEHIND-THE-EAR TYPE HEARING AID

BACKGROUND OF THE INVENTION

This invention relates to improvements in a behind-the-ear type hearing aid.

Conventional behind-the-ear type hearing aids have comprised a main body and a hook extending from the main body and arranged to engage the upper end of the earlobe of the user to hang the main body on the ear thereof. Those hearing aids have been divided into the front and bottom microphone types. In the front microphone type, a microphone has been disposed on an upper or a lower side of the front end of the main body and in the bottom microphone type, a microphone has been disposed on a bottom, a lateral side or the rear end of the main body. A self-contained amplifier has then been disposed within the main body so as to be connected across the microphone and an associated receiver which, in turn, communicates with the external auditory meatus of the user through a sound passageway extending through the main body and the hook.

The microphone has been generally used with normal conversation but may be also used to receive voices from a receiver of a telephone handset by placing the same against the receiver. At that time, the microphone of the bottom microphone type has occupied a position which is convenient to receive voices from the telephone receiver but it has been objectionable when used with normal conversations because wind noise may occur about the microphone. On the other hand, the microphone of the front microphone type has been disadvantageous in that, as the same is disposed on the upper portion of the main body, the telephone receiver must be located on the upper portion of the ear of the user which is inevitably attended with the telephone transmitter positioned so as to be spaced from the user's mouth, resulting in the front microphone type being hard to be used. In addition, the front microphone type has encountered the problem that voice from the telephone receiver partly leaks through an associated ear plug inserted into the external auditory meatus of the user so as to reach the front surface of the telephone receiver with the result that howling is apt to occur.

As a result, it has been undesirable to selectively use the single microphone on behind-the-ear type hearing aids with both normal and telephone conversation.

There have been already known behind-the-air hearing aids comprising a microphone for use with normal conversations and a telephone pickup coil for picking up a magnetic leakage flux from an associated telephone set for purposes of telephone conversation. However, telephone sets have been further improved to decrease the magnetic leakage flux therefrom to an extent that it is inevitably difficult to utilize telephone pickup coils for telephone conversations.

Accordingly, it is an object of the present invention to provide a new and improved behind-the-ear type hearing aid capable of hearing voices from a telephone set which are substantially free from a magnetic leakage flux therefrom.

SUMMARY OF THE INVENTION

The present invention provides a behind-the-ear type hearing and comprising a main body, having a generally rectangular cross section and a rear end portion terminating at a bottom surface, a close talking microphone disposed within the main body and, a pair of sound passages disposed in the main body to reach the close talking microphone, the pair of sound passages being substantially equal in length and opening on two of five surfaces defining the rear end portion of the main body.

The pair of sound passages may preferably open on the bottom surface and rear or an exposed lateral surface of the rear end portion of the main body.

In order to control the frequency response characteristic of the close talking microphone, the microphone may be connected to a low-pass filter.

The close talking microphone may advantageously include a pair of pressure type microphones substantially identical in both sensitivity and frequency response and disposed adjacent to each other, and further include a phase inverter connected between an output of one of the pressure type microphones and that of the other pressure type microphone.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
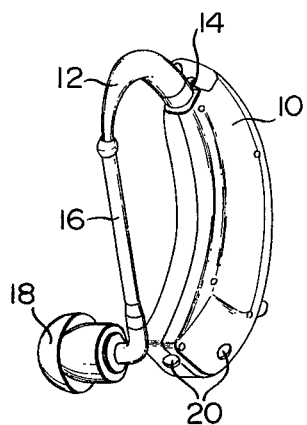
FIG. 1 is a perspective view of one embodiment according to the behind-the-ear type hearing aid of the present invention.

Referring now to FIG. 1 of the drawing, there is illustrated one embodiment according to the behind-the-ear type hearing aid of the present invention. The illustrated arrangement comprises a main body 10 having a generally rectangular cross section and somewhat curved for the reasons as will be apparent later and a hook 12 extending from a front end in this case the upper end as viewed in FIG. 1 of the main body 10. The main body 10 includes a pressure type microphone (not shown) of the conventional structure disposed therein for use with normal conversations and a sound passageway (not shown) extending therethrough to reach the microphone and opening at 16 on the upper end of the main body 10. Furthermore the main body 10 has disposed therein a self-contained amplifier for the microphone, a receiver or an earphone connected to the amplifier, etc., although they are not illustrated only for purpose of simplifying the illustration. The hook 12 has a sound passageway (not shown) extending therethrough to reach the earphone (not shown) and a free end portion connected via a sound conducting tube 16 to an ear plug 18. The hook 12 also has a shape suitable for hanging the main body 10 on the upper portion of the earlobe of the user with the inside or the lefthand side as viewed in FIG. 1 of the main body 10 substantially engaged by the outer root of the earlobe.

Thus, the hook 12 serves to hang the hearing aid on the earlobe of the user and also serves to introduce amplified voice from the earphone (not shown) into the external auditory meatus of the user.

According to the present invention, another microphone (not shown) is disposed in the main body 10 and preferably on the other or rear end portion thereof while a pair of sound passages (not shown) are disposed in the main body 10 to reach that microphones and to open on two of the five surfaces defining the rear end portion of the main body 10 for use with telephone conversations. In the illustrated example, the pair of sound passageways open on the bottom surface and the exposed lateral surface of the rear end portion of the main body as shown at 20 in FIG. 1. This is because the user can put his or her telephone hand-set at its position where a transmitter thereof is disposed adjacent to his or her mouth while a receiver thereof is disposed close to the microphone. Thus, telephone conversations can be smoothly effected and also howling can be prevented from occurring, because the telephone receiver does not pick up voice leaking from the ear plug inserted into the external auditory meatus of the user.

Figure 2:
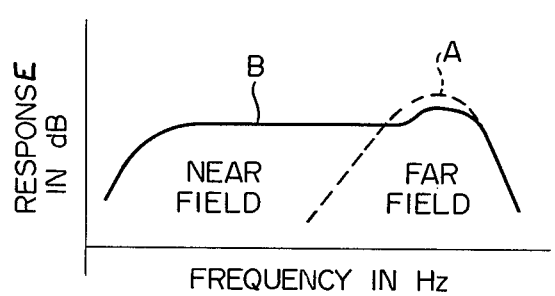
FIG. 2 is a graph illustrating the frequency response characteristics of a close talking microphone in which the present invention is interested.

Furthermore, in order to avoid the pickup of external noise by the microphone for telephone conversations to the utmost, a close talking microphone is used as that microphone. Close talking microphones are designed and constructed so that, when the sound source is far therefrom or in a far sound field, the frequency response characteristic thereof decreases with a reduction in sound frequency as shown by the dotted curve A in FIG. 2 wherein a response in decibels of a microphone is plotted on the ordinate against a sound frequency plotted on the hertzs in abscissa. However, when the sound source is in the vicinity thereof or in a near sound field, the response is raised at lower frequencies until the response is substantially uniform at a suitable distance from the sound source as shown at solid line B in FIG. 2.

Figure 3:
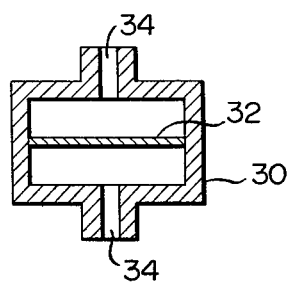
FIG. 3 is a schematic sectional view of a close talking microphone used with the present invention.

In the present invention, the close talking microphone is preferably of a pressure type as shown in FIG. 3, wherein there is illustrated in a schematic section the fundamental structure of the pressure type close talking microphone. The illustrated arrangement comprises a hollow short cylindrical housing 30 including a vibratory membrane 32 longitudinally halving the interior thereof into a pair of sound compartments and having both ends closed with respective end plates each provided on the central portion with a short cylindrical protrusion having a sound passageway 34 extending therethrough. Those sound passageways 34 are substantially equal in length and run on the longitudinal axis of the housing 30 to be remote from each other and serve to introduce sound waves into the sound compartments on both sides of the membrane 32 therethrough. The membrane 32 is connected to any suitable vibration-to-voltage converter for converting a vibration of the membrane 22 to a corresponding voltage althrough the converter is not illustrated only for purposes of simplifying the illustration.

Assuming that a sound source is located so as to be equidistant from the free ends of the two sound passageways 34, sound waves from the sound source apply sound pressures which are equal in both amplitude and phase to the free ends of the sound passageways and therefore to both sides of the membrane 32. Thus, the membrane 32 does not vibrate, resulting in a null output from the microphone. It is also assumed that the sound source is located on an extension of the longitudinal axis of the housing 30 or of the common longitudinal axis of the sound passageways 34 and at a distance from the housing 30 sufficiently long as compared with that between the free ends of the sound passageways 34. Under the assumed conditions, the free ends of the sound passageways 34 and therefore the both sides of the membrane 32 receive sound pressure substantially equal in both amplitude and phase. As a result, the microphone 16 can scarcely produce an output.

However, as the sound source decreases in distance from the microphone or the housing 30, a difference between a distance from the sound source to the free end of one of the sound passageways 34 and that from the sound source to that of the other sound passageway 34 approaches a distance between the free ends of the sound passageways 34. This results in a difference between sound pressures occurring and gradually increasing on the membrane 32. Thus, the microphone produces an increasing output. That is, it increases in sensitivity.

From the foregoing it is seen that the close talking microphone has the function of picking up sound produced adjacent thereto but not sound produced remotely therefrom and exhibits the effect of suppressing noise.

Since the close talking microphone includes a pair of sound passageways as described above, they must open on the surface of the main body 10 of the hearing aid. As described above, the sound passageways open on the bottom surface of the main body 10 and the exposed lateral surface thereof on the rear end portion which has been found to be preferable. It is also preferable to open those sound passageways on the bottom surface and the rear surface remote from the user's earlobe of the rear end portion of the main body 10. However, it is to be understood that the pair of sound passageways do not have to open on the surfaces as described above and they may open on two different surfaces of the five surfaces defining the rear end portion of the main body 10. That is, the close talking microphone is only required to include a pair of sound passageways opening on two of the surfaces defining the rear end portion of the main body or hearing aid.

It is known that, when any person hears voice from an associated telephone set by putting his or her earlobe in intimate contact with a receiver thereof or by maintaining the earlobe close to the latter, the telephone sets exhibits its intrinsic frequency response characteristic. On the other hand, when the person hears voice from the telephone set through his or her microphone, the latter is difficult to intimately contact the telephone receiver. This results in the microphone opening on the exterior. Therefore, the telephone set exhibit such a response characteristic that the lower frequency range drops in response and as the result, the higher frequency range is emphasized. Thus, the person hears high-pitched voice from the telephone set and feels displeasure in the sense of hearing. Also, the voice may decrease in articulation.

Although close talking microphones have been preliminarily designed and constructed so that they have the position of sound sources exhibiting the frequency response characteristic optimal for the particular applications, they have still the abovementioned objections due to their close talking effect.

Figure 4:
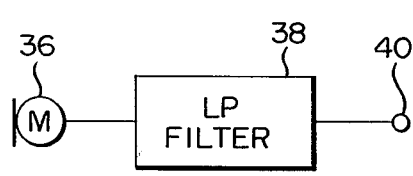
FIG. 4 is an electrical circuit diagram of the close talking microphone as shown in FIG. 3 and including means for improving the frequency response thereof.

The present invention can also eliminates those objections by the provision of a low-pass filter connected to the close talking microphone as shown in FIG. 4. In FIG. 4, the close talking microphone 36 is connected to a lowpass filter 34 having a cutoff frequency of about 1,000 hertz. The filter 38 is then connected to a junction 40 subsequently connected to the amplifier (not shown) as described above. This measure can attenuate the intermediate and higher frequency regions to impart the confortable hearing aid effect to the user.

The close talking microphone as shown in FIG. 3 may be replaced by a pair of usual pressure type microphones substantially identical in sensitivity to each other.

Figure 5:
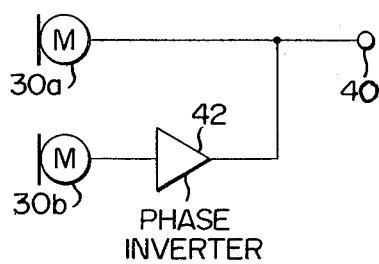
FIG. 5 is an electrical circuit diagram of a modification of the close talking microphone shown in FIG. 3.

FIG. 5 shows a modification of the close talking microphone shown in FIG. 4. The illustrated arrangement comprises a pair of usual pressure type microphones 30a and 30b substantially identical in both sensitivity and frequency response and disposed adjacent to each other. The pair of microphones 30a and 30b include respective sound passageways such as described above and one of the microphones, in this case, the microphone 30a is directly connected to an amplifier (not shown) through a junction 40. The other microphone 30b is connected to the same amplifier through a phase inverter 42 and the junction 40.

In a far sound field, the microphones 30a and 30b receive respective sound pressures equal in both amplitude and phase and produce respective output voltages substantially equal to each other because the microphones 30a and 30b are substantially identical in sensitivity to each other. Therefore, the output voltage from the microphone 30a is cancelled out at the junction 40 by an output from the phase inverter 42. As a result, a substantially null voltage is applied to the amplifier (not shown).

In a near sound field, however, the microphones 30a and 30b receive respective sound pressures which are different in phase from each other. Therefore, an output voltage from the microphone 30a is not cancelled out by that from the phase inverter 34. Thus, the amplifier (not shown) is applied with the output voltage from the microphone 30a added to that from the phase inverter 42.

From the foregoing it is seen that the arrangement shown in FIG. 5 performs the same function as the shown in FIG. 4.

Figure 6:
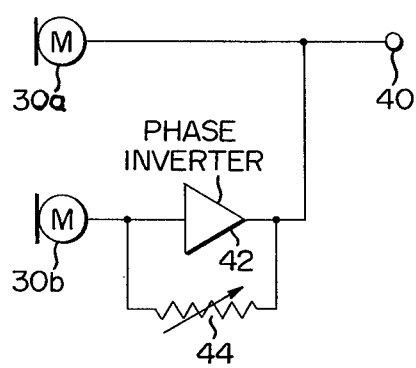
FIG. 6 is a diagram similar to FIG. 4 but illustrating a modification of the arrangement shown in FIG. 4.

In another modification of the close talking microphone shown in FIG. 6, a gain control 44 is connected across the phase inverter 42. In other respects the illustrated arrangement is identical to that shown in FIG. 4. Therefore, like reference numerals have been employed to identify the components identical to those shown in FIG. 5.

The gain control 44 controls the gain of the phase inverter 42 to adjust the output voltage from the microphone 30b so that the voltages originating from the in-phase sound pressures are not entirely cancelled out by each other but a desirable portion thereof can be developed at the junction 40. This gain control can adjust a position of an associated sound source giving the optimum frequency response characteristics.

In summary, the present invention provides a behind-the-ear type hearing aid comprising a main body having disposed at the front end thereof an opening of a sound passageway led to a microphone used with normal conversations and disposed on the rear end portion of the main openings of two sound passageways led to a close talking microphone be used for telephone conversations. Therefore the hearing aid can be used with telephone sets which decreases in magnetic leakage flux and is convenient in that when a receiver of an associated telephone handset is located adjacent to the latter openings for the close talking microphone, a transmitter or microphone of the handset can be properly positioned adjacent to the mouth of the user. Because of the use of the close talking microphone, the user can hear voice from the receiver of the handset with a high signal-to-noise ratio or with the articulation much improved. Furthermore, for conventional hearing aids including the telephone pickup coil, the user might forget that a three position switch involved changes from its position where the coil is put in operation to its position where the particular microphone used with usual conversations is put in operation. This might result in the situation that the user can hear no sound. Therefore, the user has frequently encountered objections in that the user cannot hear the desired sound, or he or she is possessed with the illusion that his or her hearing aid itself is out of order. However, the present invention does not always require such a switch and can eliminate those objections. More specifically, even though the microphone for normal conversations and that for telephone conversations would be simultaneously put in operation, the particular normal conversation can be clearly heard by the microphone for normal conversations but not by the microphone for telephone conversations. On the contrary, sound from an associated telephone set can be clearly heard by the microphone for telephone conversations but not by the microphone for normal conversations. Therefore, the present invention may only need to be provided with a single switch for simultaneously turning the two microphones on and off. However, when the hearing and is used in the street where ambient noise is high, the same may be designed and constructed so that only the microphone for telephone conversations is operated under consideration of the fact that ambient noise may enter the microphone for normal conversations to decrease an articulation of voice from a receiver of an associated telephone handset. To this end, the three-position switch included in conventional hearing aids may be modified so that, when the switch is put in its position where the microphone has been previously put in operation, the two microphones are put in operation, and when the switch is put in its position previously used for telephone, only the microphone for telephone conversations is put in operation with the remaining position used to turn the two microphones off.

While the present invention has been illustrated and described in conjunction with a few preferred embodiments, it is to be understood that numerous changes and modifications may be resorted to without departing from the spirit and scope of the present invention.

What is claimed is:

1. A behind-the-ear type hearing aid comprising a main body having a generally rectangular cross section and a rear end portion in the form of a pentahedron terminating at a bottom surface forming one surface of said pentahedron, a microphone for use with normal conversation disposed within said main body and a sound passageway disposed within said main body so as to reach said microphone, a close talking microphone disposed within said main body, and a pair of sound passageways disposed within a rear portion of said main body so as to reach said close talking microphone, said pair of sound passageways opening on two of five surfaces defining the pentahedral rear end portion of said main body.

2. A behind-the-ear type hearing aid as claimed in claim 1, wherein said pair of sound passageways respectively open on the bottom surface and the exposed lateral surface of said rear end portion of said main body.

3. A behind-the-ear type hearing aid as claimed in claim 1, wherein said pair of sound passageways respectively open on the bottom surface and the rear surface of said rear end portion of the main body.

4. A behind-the-ear type hearing aid as claimed in claim 1, wherein said close talking microphone is connected to a low-pass filter having a cutoff frequency of about 1,000 hertz.

5. A behind-the-ear type hearing aid as claimed in claim 1, wherein said close talking microphone comprises a pair of pressure type microphones which are substantially identical in sensitivity and are disposed adjacent to each other, and wherein a phase inverter is connected between an output of one of said pair of pressure type microphones and that of the other of said pair of pressure type microphones.

6. A behind-the-ear type hearing aid as claimed in claim 5, wherein a gain control is connected across said phase inverter.

7. A behind-the-ear type hearing aid comprising a main body having a generally rectangular cross section and a rear end portion terminating at a bottom surface, a close talking microphone disposed within said main body, and a pair of sound passageways disposed within said main body so as to reach said close talking microphone, said pair of sound passageways being substantially equal in length and opening on two of five surfaces defining the rear end portion of said main body;
   wherein said pair of sound passageways respectively open on the bottom surface and the exposed lateral surface of said rear end portion of said main body.

8. A behind-the-ear type hearing aid comprising a main body having a generally rectangular cross section and a rear end portion terminating at a bottom surface, a close talking microphone disposed within said main body, and a pair of sound passageways disposed within said main body so as to reach said close talking microphone, said pair of sound passageways being substantially equal in length and opening on two of five surfaces defining the rear end portion of said main body;
   wherein said pair of sound passageways respectively open on the bottom surface and the rear surface of said rear end portion of the main body.

9. A behind-the-ear type hearing aid comprising a main body having a generally rectangular cross section and a rear end portion terminating at a bottom surface, a close talking microphone disposed within said main body, and a pair of sound passageways disposed within said main body so as to reach said close talking microphone, said pair of sound passageways being substantially equal in length and opening on two of five surfaces defining the rear end portion of said main body;
   wherein said close talking microphone is connected to a low-pass filter having a cutoff frequency of about 1,000 hertz.

10. A behind-the-ear type hearing aid comprising a main body having a generally rectangular cross section and a rear end portion terminating at a bottom surface, a close talking microphone disposed within said main body, and a pair of sound passageways disposed within said main body so as to reach said close talking microphone, said pair of sound passageways being substantially equal in length and opening on two of five surfaces defining the rear end portion of said main body;
   wherein said close talking microphone comprises a pair of pressure type microphones which are substantially identical in sensitivity and are disposed adjacent to each other, and wherein a phase inverter is connected between an output of one of said pair of pressure type microphones and that of the other of said pair of pressure type microphones.

11. A behind-the-ear type hearing aid as claimed in claim 10, wherein a gain control is connected across said phase inverter.

* * * * *